Figure 3:
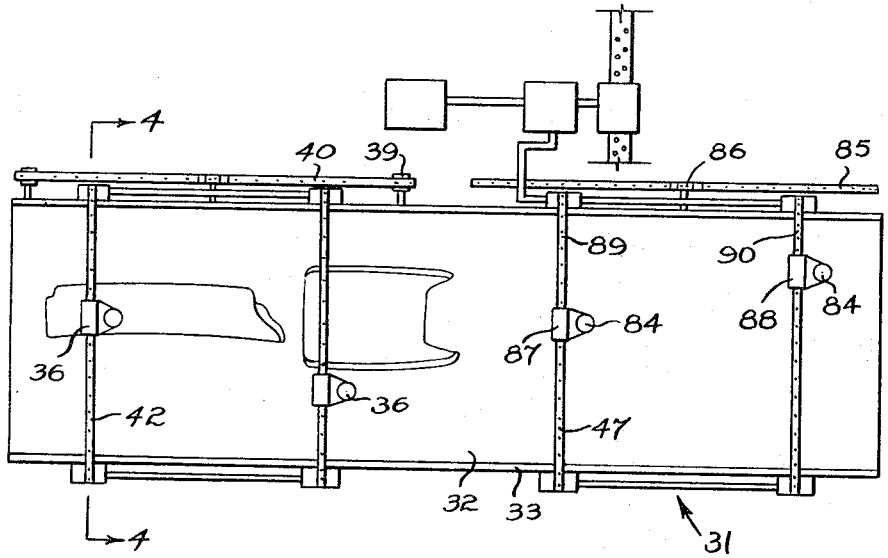

April 2, 1968            C. G. KELSEY            3,375,568
MEANS AND METHOD FOR THE CONSTRUCTION OF TOOLS
Filed Nov. 23, 1965                          6 Sheets-Sheet 1
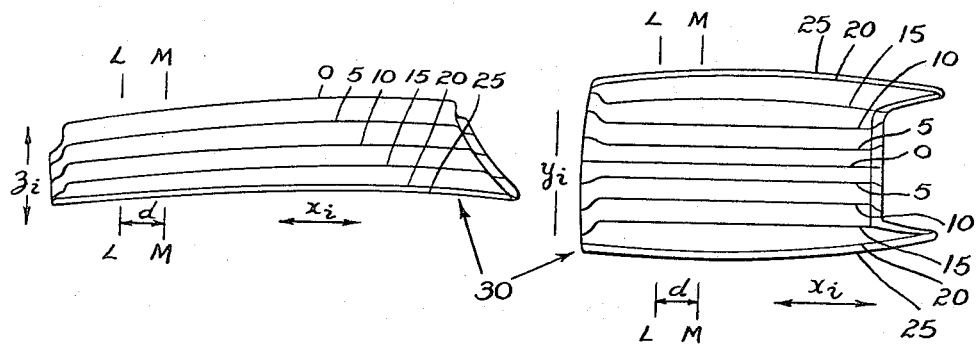
FIG 1
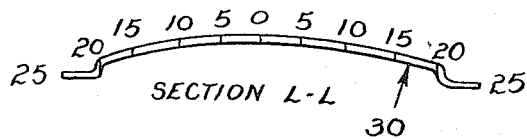
FIG 2
INVENTOR.
CHRISTOPHER G. KELSEY
BY
Oldham & Oldham
ATTYS.

April 2, 1968   C. G. KELSEY   3,375,568
MEANS AND METHOD FOR THE CONSTRUCTION OF TOOLS
Filed Nov. 23, 1965   6 Sheets-Sheet 2

INVENTOR.
CHRISTOPHER G. KELSEY
BY
Oldham & Oldham
ATTYS.

April 2, 1968 C. G. KELSEY 3,375,568
MEANS AND METHOD FOR THE CONSTRUCTION OF TOOLS
Filed Nov. 23, 1965 6 Sheets-Sheet 4

INVENTOR.
CHRISTOPHER G. KELSEY
BY
Oldham & Oldham
ATTYS.

April 2, 1968 C. G. KELSEY 3,375,568
MEANS AND METHOD FOR THE CONSTRUCTION OF TOOLS
Filed Nov. 23, 1965 6 Sheets-Sheet 6

INVENTOR.
CHRISTOPHER G. KELSEY
BY
Oldham & Oldham
ATTYS.

United States Patent Office 3,375,568
Patented Apr. 2, 1968

3,375,568
MEANS AND METHOD FOR THE
CONSTRUCTION OF TOOLS
Christopher G. Kelsey, Glenalta, South Australia, Australia, assignor to Data Resolved Tools Pty. Ltd., Adelaide, South Australia, Australia
Filed Nov. 23, 1965, Ser. No. 509,362
Claims priority, application Australia, Nov. 24, 1964, 52,074/64
5 Claims. (Cl. 29—407)

This invention relates to the means and method for the construction of tools, including models, dies and other tools wherein it is desired to construct a tool to the shape dictated by a drawing.

According to one form, the invention may be said to consist of a tool which comprises a stack of templates parallel to each other and fixed relative to each other and having a filler material cemented to and disposed between adjacent templates. The method according to a simple form may be said to consist in the cutting of templates to a shape dictated by a drawig, the templates representing cross-sectional shapes of the drawing at spaced intervals, and assembling the templates into a stack after they have been cut.

In our Australian patent application No. 42,462, dated Mar. 24, 1964, we disclosed an invention entitled, "Draughting Data Resolving Machine," one of the objects of which was to provide means whereby data from two projections of a drawing could be indirectly placed on to a magnetic or punched tape data storage means in the form, if necessary of a tipped view. The machine which was disclosed in the said patent application had a tracing carriage and a second carriage which constituted a printing carriage, or the equivalent of the second carriage which could be used for feeding a punched tape. It is obvious from a reading of the said patent application that one of the novel elements was the ability to determine points in the space dictated by two views of a drawing, and from this, quite clearly, coordinates which lie on a section of a drawing can be readily determined and fixed in space. It is these coordinates, of course, which are registered on a punched tape or magnetic tape.

According to this invention, the templates can be machined from these coordinates, either directly or from information stored on a punched or magnetic tape, use being made in the event of the shape between the coordinates being curved and not straight, of known interpolating means to give a parabolic or circular interpolation, or any other interpolation which may be required.

The embodiment of the invention which is described hereunder will be limited to a description of a method and means which utilizes a punched tape storage system, but quite clearly there are many alternative methods and means which can be used. For example, a typical alternative would be the use of a hot wire to cut through a foam plastic, or a direct control of a router from the drawing as the coordinates are determined, and obviously these and other similar equivalents will be used for special applications, but the reason the punched tape system has been chosen for description herein is that it is anticipated this will be required for most applications.

Figure 4:
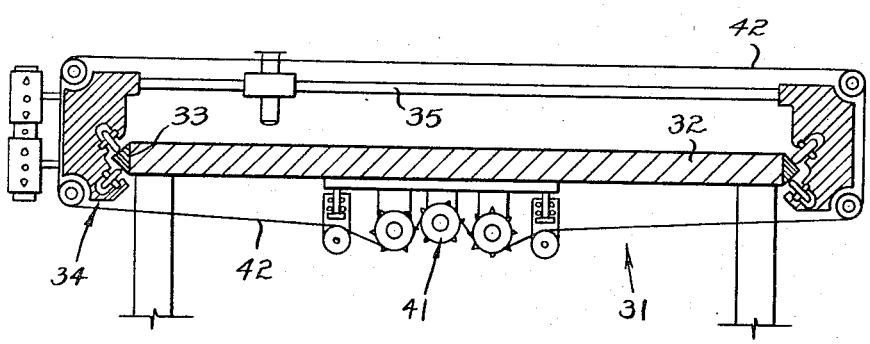
Figure 5:
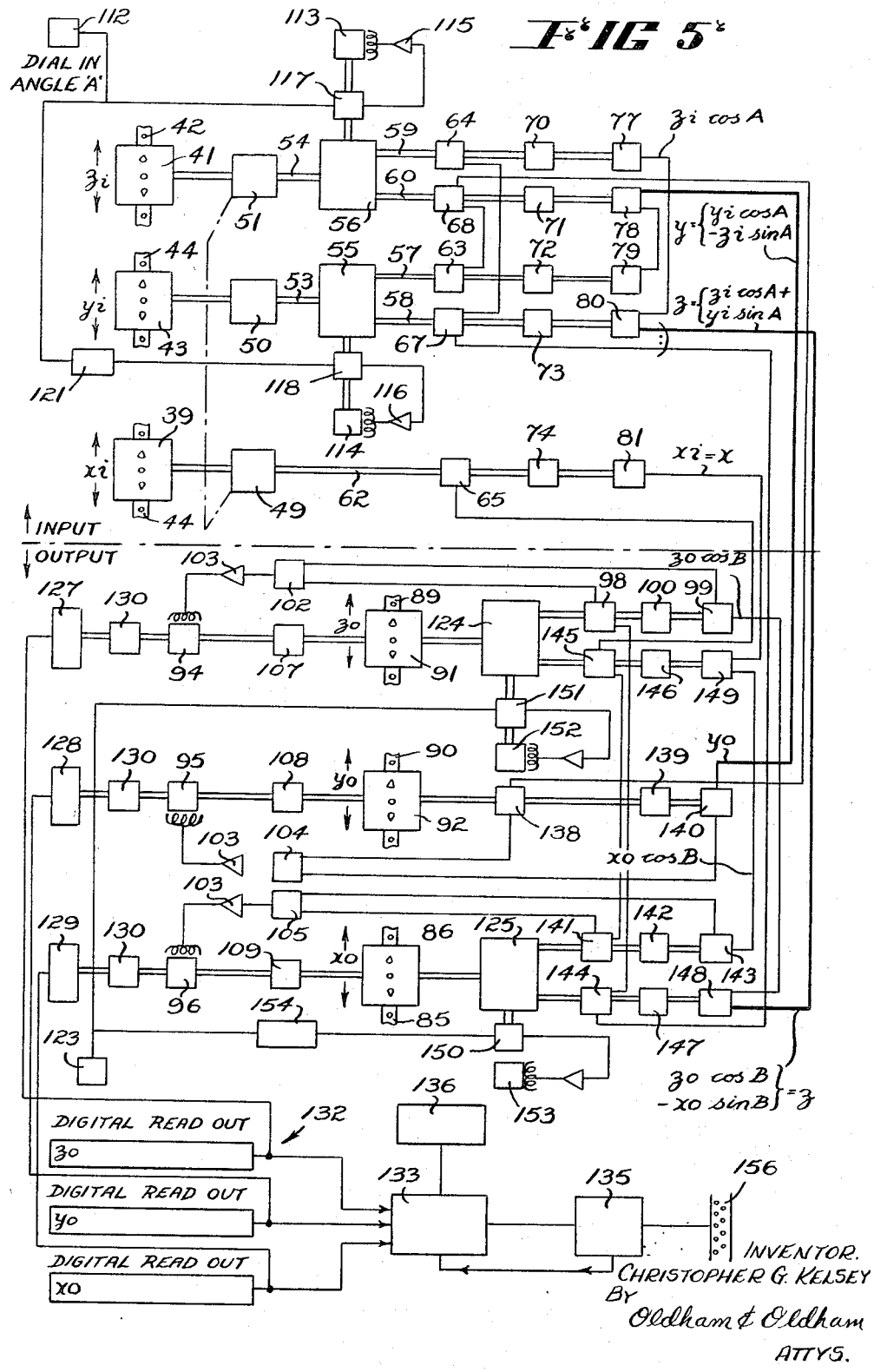
Figure 6:
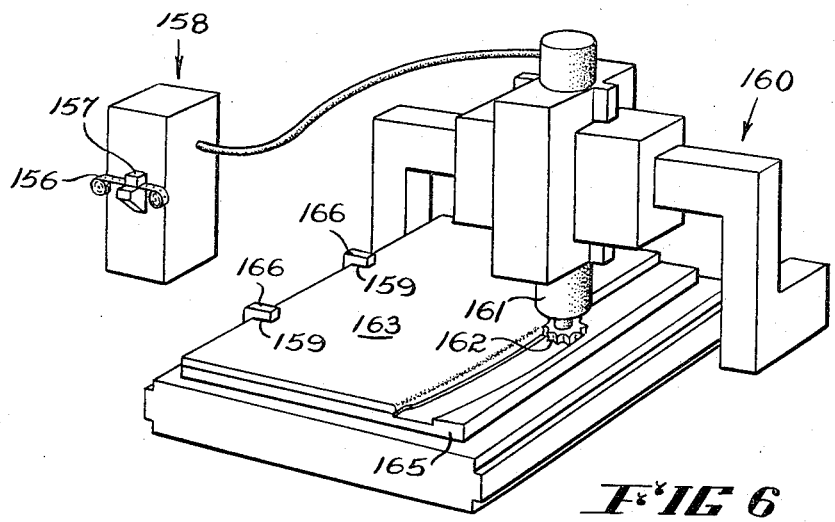
Figure 7:
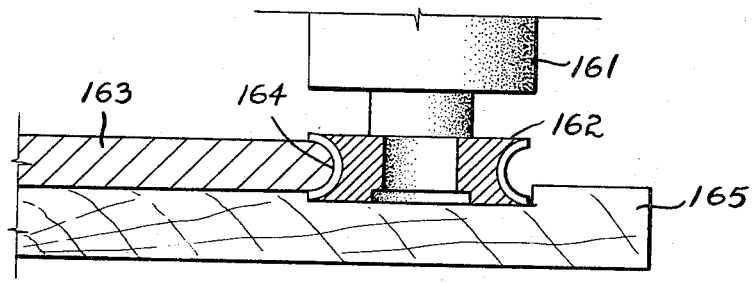
Figure 8:
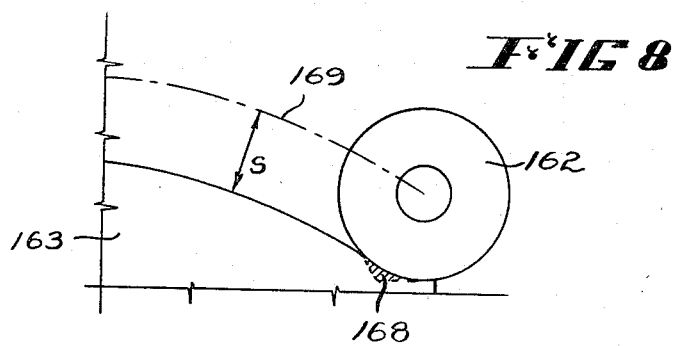
Figure 9:
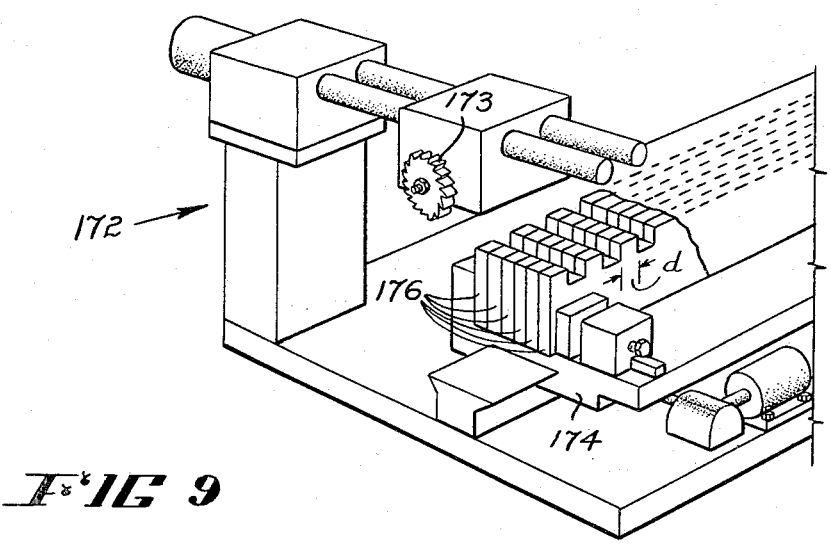
Figure 10:
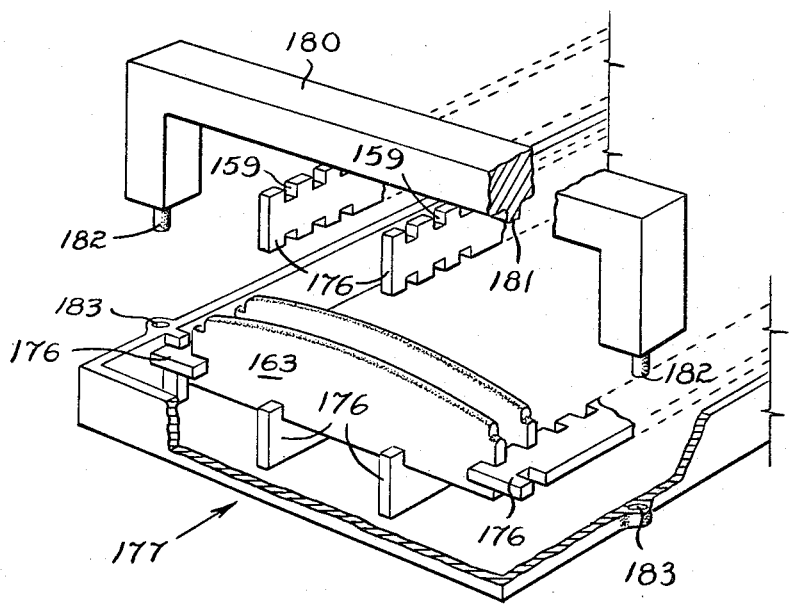
Figure 11:
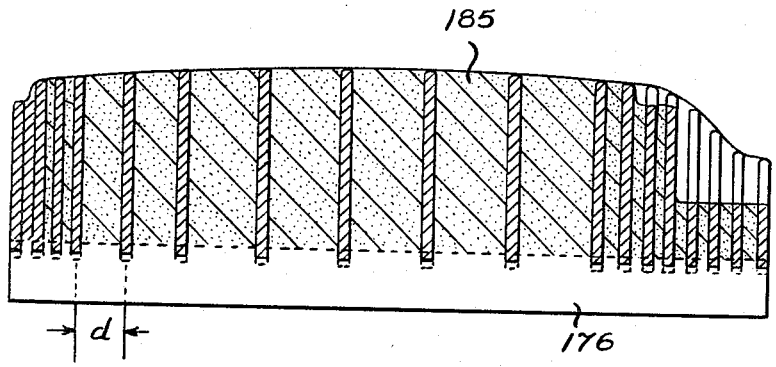

The embodiment of the invention is described in detail with reference to and is illustrated in the accompanying drawings, in which:

FIG. 1 shows an $x_1$—$z_1$ (plan) and $x_1$—$z_1$ (elevational) view of a sheet metal panel, which could, for example, be a roof panel, and shows common contour lines for these panels, FIG. 2 shows cross sections across the views of FIG. 1, FIG. 3 is a plan view of a drawing table on which the views of FIGS. 1 and 2 are positioned, FIG. 4 is a section on line 4—4 of FIG. 3, FIG. 5 is a circuit diagram showing the arrangement of elements used to obtain a punched tape, FIG. 6 shows a machine tool (router) profiling a template according to a cross-section of FIG. 1 (say L—L or M—M), FIG. 7 is an enlarged sectional view of the router cutter, FIG. 8 illustrates the router cutter path, showing shaded that portion which needs to be hand worked, FIG. 9 illustrates a milling machine cutting head forming slots in spacer bars, FIG. 10 shows a device for securing the templates together in a parallel relationship, and FIG. 11 is a longitudinal section through a tool.

Referring first to FIG. 1 which shows the plan and elevation view of a sheet metal panel, this can be regarded as the $y_1$, $z_1$, and $x_1$, $z_1$ views when referred to normal nomenclature of solid geometry. The panel 30 is marked off in corresponding contour lines which are shown 0, 5, 10, 15, 20 and 25 in accordance with normal panel drafting practice. FIG. 2 illustrates the sections across the panel on the lines L—L and M—M of FIG. 1 which are disposed apart by a distance $d$. It is assumed for the purpose of this embodiment that it is desired to produce a male model of this part, that is, a model the outer shape of which is complementary to the inner face of the panel 30.

FIGS. 3 and 4 illustrate a drafting data resolving machine 31 having a table 32 carrying on it longitudinally extending tracks 33 (that is, extending in the $x$ direction) which support a freely movable follower carriage 34. The follower carriage 34 is provided with transverse tracks 35 which are parallel to one another and at right angles to the longitudinal tracks 33, and these in turn carry on them microscopes 36 which are provided with cross hairs to provide simple line follower means.

The longitudinal movement of the follower carriage 34 is transmitted into an analogous electrical circuit through a synchro coupled to a sprocket drum 39 driven by a perforated band 40, this being the $x_1$ input synchro, the $z_1$ input synchro coupled to the sprocket drum 41 (FIG. 4) being driven also through a perforated band designated 42, and similarly the $y_1$ input synchro coupled to sprocket drum 43 (shown solely on FIG. 5) being driven by the perforated band 44. If desired racks and pinions can be used in lieu of perforated bands, or in the alternative again use may be made of recirculating ball lead screws, these alternatives depending upon the degree of accuracy and the degree of freedom of movement required for specific applications.

The drafting data resolving machine 31 also carries on it a readout carriage 47 which is servo motor driven in accordance with the details contained in our cognate Australian patent applications Nos. 42,462 and 42,463 of Mar. 24, 1964 and 49,967 of Sept. 30, 1964.

In these said patent applications we described and claimed means and method for obtaining "tipped" views of a drawing, which consisted of resolving the $y$ and $z$ movements to a fraction thereof corresponding to the sine or cosine of an angle of tip (or "tilt") and arithmetically adding in accordance with the following:

$$x = x_1$$
$$y = y_1 \cos A - z_1 \sin A$$
$$z = y_1 \sin A + z_1 \cos A$$

These expressions are valid for the first quadrant of Cartesian coordinates, and for a single tip (or tilt) through an angle A.

Referring now to the circuit diagram of FIG. 5 which again is identical to the above-mentioned cognated patent applications, each sprocket drum 39, 41 and 43 drives into variable ratio gearboxes 49, 50 and 51 respectively so that by setting the same ratio on each box a drawing scale change is effected.

The output shafts 53 and 54 of the respective gearboxes 50 and 51 are coupled to ball or gearbox resolvers 55 and 56 respectively. Each resolver has two output shafts, those for resolver 55 being designated 57 and 58 and those for resolver 56 being designated 59 and 60. The effect of the resolvers is to cause one output shaft to rotate through an angle proportional to the input angle multiplied by the cosine of a quantity set into the resolver while the other output shaft rotates through an angle proportional to the input angle multiplied by the sine of the same quantity. Thus the angular rotation of shaft 59 is proportional to the quantity $z_1 \cos A$, that of shaft 60 to $z_1 \sin A$, that of shaft 57 to $y_1 \cos A$, and that of shaft 58 to $y_1 \sin A$.

Mounted on shafts 57, 59 and the shaft 62 from gearbox 49 are synchros 63, 64 and 65 respectively which produce electrical voltages representing the quantities $z_1 \cos A$, $y_1 \cos A$ and $x_1$ respectively. Differential synchros 67 and 68 are mounted on shafts 58 and 60 respectively and electrical connections are made between these synchros and the synchros 63 and 64 in such a way that the electrical outputs of 68 and 67 represent the quantities ($y_1 \cos A - z_1 \sin A$) and ($y_1 \sin A + z_1 \cos A$) which are also the quantities $y$ and $z$.

Because the validity of this representation only extends over one revolution of the various shafts connected to the synchros and differential synchros, the assembly of above mentioned synchros, differential synchros, and wiring is known collectively as the fine input channel.

Mounted on the same shafts as synchros 64, 68, 63, 67 and the output shaft 62 of gearbox 49 are respective gearboxes 70, 71, 72, 73 and 74 which interconnect the synchros with respective differential synchros 77, 78, 79, 80 and 81 which are interconnected as shown in FIG. 5 so as to produce electrical voltages representing the quantities $x$, $y$ and $z$. However, because of the gearboxes, the range of representation covers the full range of variation of the quantities $x_1$, $y_1$ and $z_1$. For this reason, this assembly of synchros and differential synchros, and wiring is termed the coarse input channel.

Thus when the operators of the machine follow any line on the input drawing with combined movements of the follower carriage 34 ($x_1$ movement) and the $y_1$ and $z_1$ movements of the microscopes 36 along respective transverse tracks 35, the instantaneous coordinates of a point $x_1$, $y_1$ and $z_1$ on any line are transformed into fine and coarse electrical signals $x$, $y$ and $z$ corresponding to a tip through an angle A about axis $IX_1-O-IX$.

It will subsequently be shown that such movements of the input carriages and saddles will cause servo controlled movements of the readout carriage 47 and its saddles so as to generate instantaneous coordinates fine and coarse $x_o$, $y_o$ and $z_o$ and that these coordinates in turn correspond to the above mentioned fine and coarse $x_o$, $y_o$ and $z_o$ when tipped through an angle B about an output axis $OY_1-O-OY$ (that is, output relative to first tip).

The readout carriage 47 is identical to the follower carriage 34 except that the saddles carry solenoid operated pens 84 which are operated by buttons (not shown) on the input carriage.

An endlesss perforated band 85 attached to the output carriage 47 and driven by sprocket drum 86 moves the carriage to produce $x_o$ dimensions. Similarly saddles 87 and 88 are moved via bands 89 and 90 respectively by rotation of drums 91 and 92 respectively to produce $z_o$ and $y_o$ dimensions respectively. Rotation of the drums 91, 92 and 86 is effected by output servo motors 94, 95 and 96 respectively.

In a similar manner to those on the input table the bands on the output table are connected through drums, resolvers, and synchros to produce the quantities ($z_o \cos B - x_o \sin B$), $y_o$ and ($z_o \sin B + x_o \cos B$) represented by electrical voltages in fine and coarse channels.

When the output system is in its correct position, there will be no difference between these quantities and the quantities $x$, $y$ and $z$. Accordingly, the fine input channel is electrically connected to the fine output channel and the coarse input channel is electrically connected to the coarse output channel. If there is a difference in say, $z$, this causes voltages to appear on the outputs of synchros 98 and 99 which are coupled together by the gearbox 100. These voltages are supplied to 102 which is a sector switch or similar device which compares the amplitude of the coarse error voltage, which is the output of synchro 99, with a reference voltage and connects the coarse error voltage to amplifier 103 if the error voltage is greater than the reference. Otherwise the switch 102 connects the fine error voltage, which is the output of synchro 98, to the amplifier 103. Similar operations occur in the other two sector switches 104 and 105. The outputs of the three amplifiers 103 are fed respectively to motors 94, 95 and 96 which through gearboxes 107, 108, 109 respectively drive the output drums 91, 92 and 86 in such a direction as to cause the error voltages to become zero, at which point the drums have assumed their correct position in respect to the input drums 41, 43 and 39.

A synchro 112 controls a pair of set up motors 113 and 114 through respective amplifiers 115 and 116, the synchros 117 and 118 forming portion of servo loops. The synchro 112 has the function of determining a first angle of "tip" A, and is associated with graduative means to provide a ready identification of the angle which is to be "tipped." The set up motor 113 is coupled to the resolver 56 through synchros 117. The resolver 55 is similarly driven but by the set up motor 114. Differential synchro 121 allows the setting of the resolver 55 to be varied slightly, in order that the accuracy may be improved.

In a similar fashion syncro 123 sets up resolvers 124 and 125 and determines the second angle of "tip" B.

Mechanically coupled to the output sprocket drums 91, 92 and 86 are encoders 127, 128 and 129 respectively by means of respective gearboxes 130.

The outputs from the encoders 127, 128 and 129 are "teed" to visual digital readout designated 132 so that at any instant the dimension can be determined, while the output also enters a sequence programmer 133. In this embodiment the sequence programmer is of the type which includes a series of indexing switches which are operated by relays to put in order the sequence of tape punching signals from $x_o$, $y_o$, $z_o$ readout. This can vary of course according to the format of tape used. The output of the sequence programmer feeds into a tape puncher 135, but this feeds back into the sequence programmer to control the order of punching. The auxiliary instructions 136 are in accordance with usual practice for giving instructions such as parabolic stop or start to the tape punching device.

Many portions of the circuit shown in FIG. 5 are simply repetitive, and the following schedule sets out equivalent elements of circuit parts:

Synchro 138 is equivalent to synchro 65
Gearbox 139 is equivalent to gearbox 74
Synchro 140 is equivalent to synchro 81
Synchro 141 is equivalent to synchro 98
Gearbox 142 is equivalent to gearbox 100
Synchro 143 is equivalent to synchro 99
Differential 144 and synchros 145 are equivalent to differential 68 and synchros 67
Gearboxes 146 and 147 equivalent to gearboxes 71 and 73
Differential 148 and synchros 149 equivalent to differential 78 and synchros 80
Synchros 150 and 151 equivalent to synchros 118 and 117
Set up motors 152 and 153 equivalent to set up motors 113 and 114
Synchro 154 is equivalent to synchro 121

It may be noted that the synchro 154 constitutes realignment adjustment means.

The tape 156 which has been punched by the tape puncher 135 is fed through a tape readout device 157 (FIG. 6) which is constructed in accordance with known principles and which incorporates an interpolating device shown generally as 158 and which again is constructed in accordance with known principles. It can for example be in accordance with the Great Britain Patent No. 796,994 of Electric & Musical Industries Limited. The function of the interpolating device is to produce a smooth curve which may be, according to the said British Patent, the envelope shape of a series of parabolators passing through the various cross section points, illustrated for example in FIG. 2. The templates have what may be regarded as "standard" notches 159 in their lower edges.

The command signals from the interpolating device control a machine tool 160 which has on it a router head 161 being provided with a formed cutter 162 (FIG. 7) which cuts a template 163 of aluminium to have a convex outer edge 164. The radius of the cutting face of the formed cutter 162 should be less than the anticipated interpolation drop-off on the matching contour wherever possible. There will be occasional instances, for example vertical walls, where this is not possible. The aluminium template 163 is conveniently clamped to a wooden block 165 to provide space for the bottom surface of the cutter 162. In the alternative the template 163 may be clamped direct to a metal plate and the cutter 162 can be formed in such a way that it leaves a "flash" of template metal adjacent the metal plate, the flash being removed afterwards. In either case the standard notches 159 engage locating blocks 166 on the machine tool 160 for alignment in the x direction.

Quite clearly there will be cases where the radius of the cutter 162 will be greater than the radius of the template to be cut, and this is illustrated in FIG. 8 wherein the shaded portion marked 168 of the template 163 needs to be removed by hand. The chain dotted line of FIG. 8 marked 169 illustrates the path taken by the centre of the cutter 162 in its transverse, this having a "stand off" marked S from the cut edge which is calculated again by the interpolating device 158.

If a tool is to be constructed with a stack of templates parallel to each other and fixed relative to each other a danger exists in the templates "oil canning" if they are retained for example merely along their bottom edges. Furthermore the cost of a tool having the templates touching one another would be excessively high. It is therefore desirable to provide spacer means which will be capable of holding the templates with their centre planes exactly at the same positions as the sections which they are to represent.

FIG. 9 illustrates a milling machine 172 having a cutter 173 of exactly the same width as the thickness of the templates, the milling machine being provided with a movable table 174 which is instructed by the punched tape 156 to progress a distance exactly corresponding to the distance between adjacent templates. Thus the distance marked $d$ on FIG. 9 would correspond with the distance marked $d$ on FIG. 11 and on FIG. 1, representing the distance between the sections L—L and M—M, assuming that these sections correspond to adjacent templates.

The milling cutter 173 cuts through a series of spacer bars 176 simultaneously when the templates are being cut, and after the templates have been cut the spacer bars 176 are fitted to a standard support base 177, the two lower spacer bars 176 having their notches interengaging with standard notches 159 in the templates 163 so that the templates are aligned in the x direction corresponding to the alignment they receive when cut on the machine tool 160. The ends of the templates are engaged by the two side spacer bars 176 as shown in FIG. 10, and the upper edges of the templates are aligned by the two upper spacer bars 176 which are engaged by removable bridge members 180 the bridge members 180 each having a tongue 181 to engage a corresponding standard notch 159 in the upper spacer bars 176. The bridge members 180 are provided with depending guide pins 182 which engage in apertures 183 in the support base 177. Thus the templates 163 are retained on all sides by the spacer bars 176.

When the templates are so retained a setting material 185 such as hard plaster of Paris or epoxy resin is poured between them and is smoothed to the required contour, the templates providing "witness lines" to simplify this operation. The bridge members 180 and the upper spacer bars 176 are removed after the templates have been firmly secured relative to one another by the setting material. If desired the templates may remain within the support base 177 or may be removed therefrom as shown in FIG. 11 relying upon the cohesion and adhesion of the setting material 185.

A consideration of the above embodiment will indicate that the construction of a shape is simplified in as much as the "witness lines" are accurately established by the templates, and it will be seen that the shape is easily checked since the contour lines marked 0, 5, 10, 15 etcetera extend transversely of the templates (that is longitudinally of the model or in the x direction) and thus provide a minimum double check of the shape to drawing. If desired further templates may be made exactly to the shape of these contour lines to provide an "egg crate" base for containing the setting material.

By simply routing two sets of templates displaced in opposite directions (that is, reversing the x movement) right and left hand models may be made from a single tape, and by reversing the z movement and increasing cutter diameter by metal panel thickness a female model may be cut. This eliminates the laborious hand work in making of right-left hand male-female models.

While one complete embodiment of the invention has been disclosed herein, it will be appreciated that modification of this particular embodiment of the invention may be resorted to without departing from the scope of the invention as defined in the appended claims.

I claim:

1. The method of construction of a composite template, or tool comprising the steps of cutting a series of templates each with an edge profile corresponding to one of a series of spaced parallel sections of a drawing, cutting notches in a plurality of spacer bars, the spacing between the notches corresponding to the spacing between the parallel sections of the drawing, locating the templates in corresponding notches of the spacer bars thereby retaining the templates together in a parallel relationship with a relative spacing equal to the relative spacing between corresponding parallel sections of the drawing, filling the spacings between the templates with a filler material which cements itself to the side walls of the templates, and smoothing the surface of the filler material to provide a contour surface between the said edge profiles of the templates.

2. The method of construction of a composite template, or tool according to claim 1 wherein the filler material is an epoxy resin.

3. The method of construction of a composite template, or tool according to claim 1 wherein the filler material is plaster of Paris.

4. The method of construction of a composite template, or tool from two views of a drawing representing the x and y coordinates and the x and z coordinates respectively comprising the steps of placing the two views of a drawing on the table with the x axis disposed parallel to direction of longitudinal movement of a follower carriage having two transverse line followers thereon, transmitting electrical signals corresponding to displacement in the direction of the x axis and recording on a punched tape to identify spacings between adjacent parallel sections across the $x$ axis, transmitting signals corresponding to displacement of $y$ and $z$ positions of the respective transverse line followers on said carriage for coordinates determined by intersection of contour lines extending in the $x$ direction of the drawing by respective said transverse line followers for any one cross-section, converting displacement of $y$ and $z$ directions into corresponding electrical signals and punching said tape in accordance with said signals, cutting a series of templates with a contour interpolated by the $y$ and $z$ signals recorded on said tape, cutting notches in spacer members in accordance with the $x$ signals on said tape, building said templates into a stack spaced by said notches thereby positioning the templates in a parallel spaced relationship corresponding to the sections of the drawing, and filling the spacings between the templates with a filler material which cements itself to the side walls of the templates.

5. The method according to claim 4 wherein the displacement of the $y$ and $z$ positions is resolved into the sine and cosine of an angle of tip A and arithmetically added according to the following formulae:

$x = x_1$
$y = y_1 \cos A - z_1 \sine A$
$z = y_1 \sine A + z_1 \cos A$

References Cited

UNITED STATES PATENTS 2,903,390    9/1959    Kojima _____ 29—407 X
3,195,411    7/1965    MacDonald et al. __ 29—407 X THOMAS H. EAGER, *Primary Examiner.*